May 22, 1923.

W. S. CRANDELL 1,456,121

ADJUSTING MECHANISM FOR FRICTION GEARS

Filed July 10, 1922  4 Sheets-Sheet 4

Patented May 22, 1923.

1,456,121

UNITED STATES PATENT OFFICE.

WILLIS S. CRANDELL, OF ELSMERE, NEW YORK, ASSIGNOR TO ALBANY PAPER MILL MACHINERY COMPANY, INC., OF ALBANY, NEW YORK, A CORPORATION OF NEW YORK.

ADJUSTING MECHANISM FOR FRICTION GEARS.

Application filed July 10, 1922. Serial No. 573,903.

*To all whom it may concern:*

Be it known that I, WILLIS S. CRANDELL, a citizen of the United States, a resident of Elsmere, in the county of Albany and State of New York, have invented a certain new and useful Adjusting Mechanism for Friction Gears, of which the following is a specification.

The invention relates to a mechanism for adjusting the relative positions of engaging gears, more particularly of the friction type, to obtain proper contact between the friction surfaces of such gears, or to vary the speed ratio thereof; in its preferred or complete form, the invention provides both of the above-mentioned adjustments.

One object is to provide a supporting mechanism for gears of the above type, which when the pressure between the gears becomes so excessive as to endanger injury or destruction of their friction surfaces, will operate to relieve the pressure between the gears before any substantial injury thereto is effected.

Other objects of the invention, are to provide such a mechanism which will be simple and readily operable in construction, and yet capable of providing adjustment of gears which are transmitting substantial amounts of power, and which may be adequately locked or held in proper position to prevent undesirable shifting between the gears.

Further objects of the invention will be in part obvious and in part specifically pointed out in the description hereinafter contained, which, taken in connection with the accompanying drawings discloses a preferred embodiment of the invention; such embodiment, however, is to be considered merely as illustrative of its principle. In the drawings.

Figure 1:
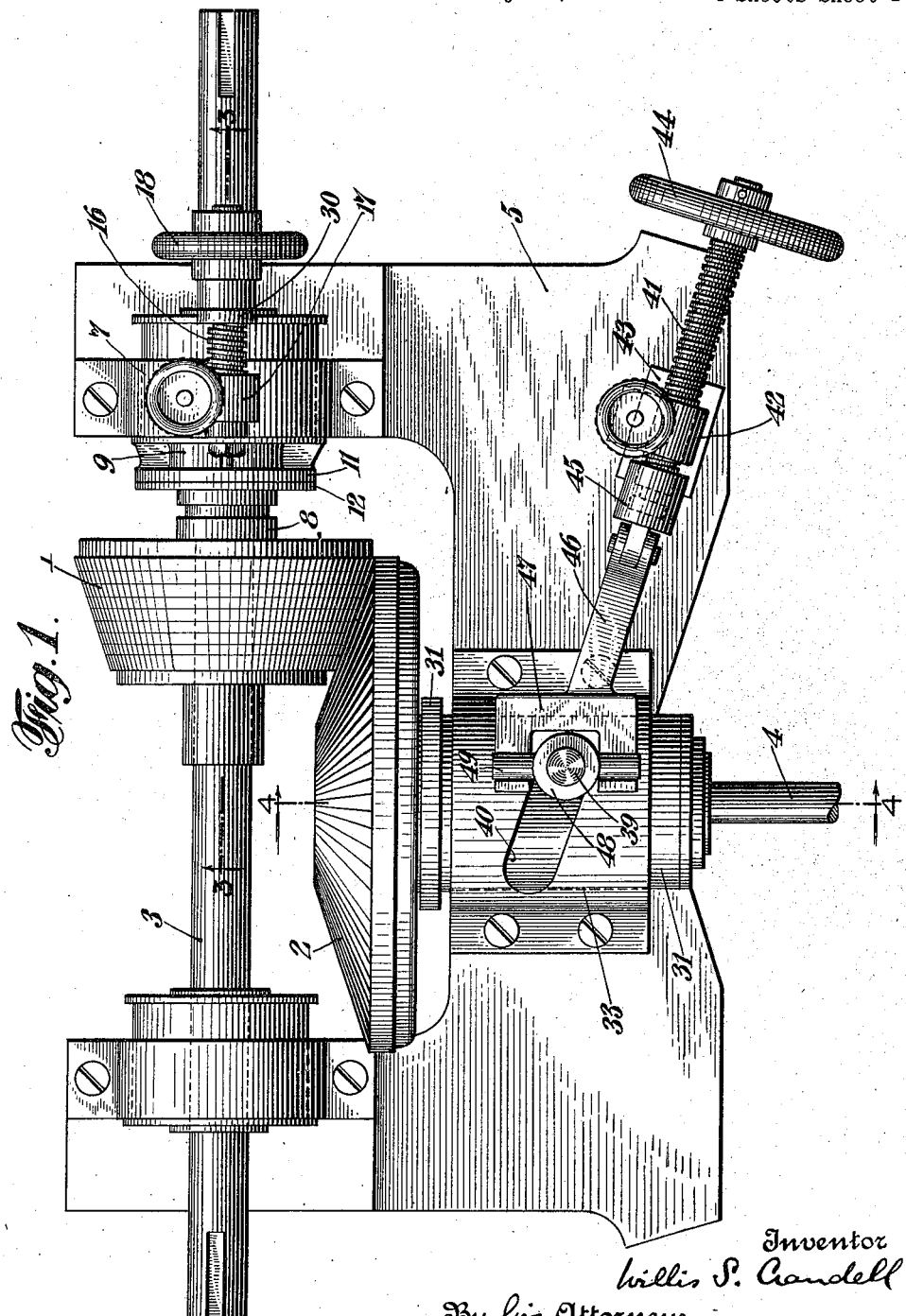
Fig. 1 is a plan view showing a pair of friction gears and associated parts, provided with an adjusting mechanism constructed in accordance with the invention.
Figure 3:
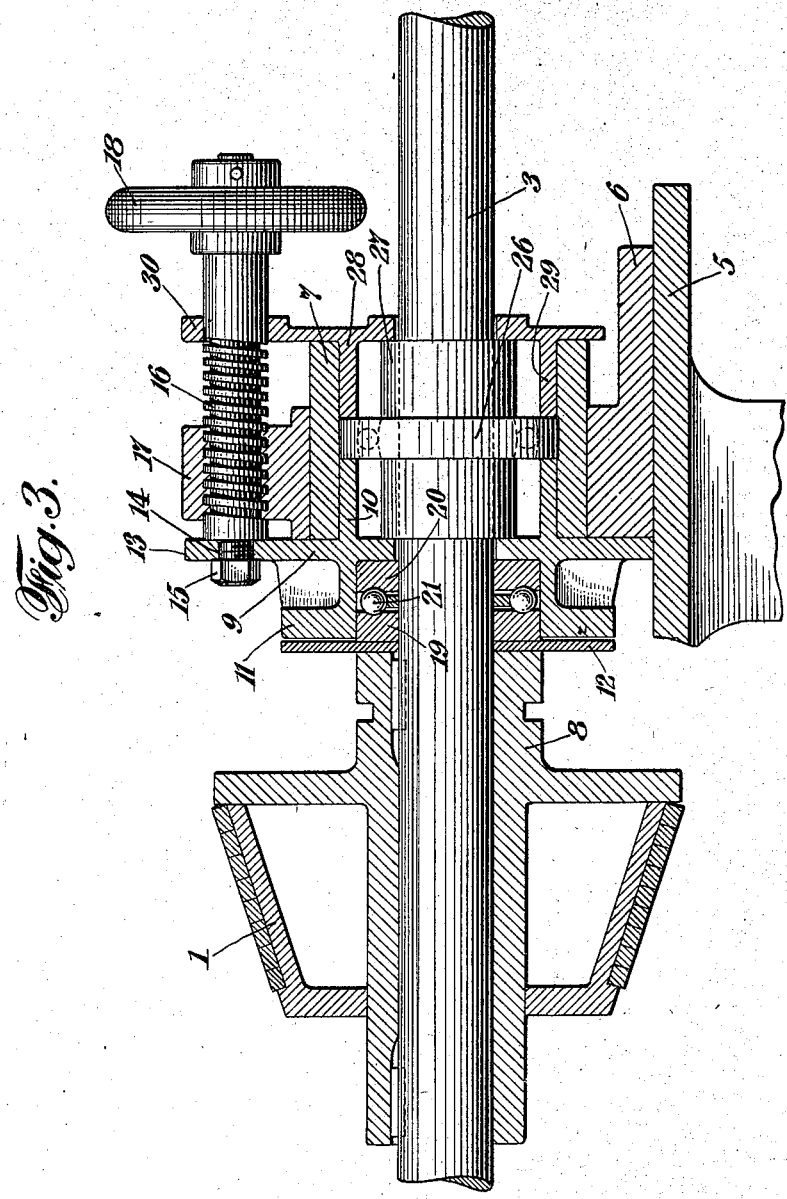
Figure 4:
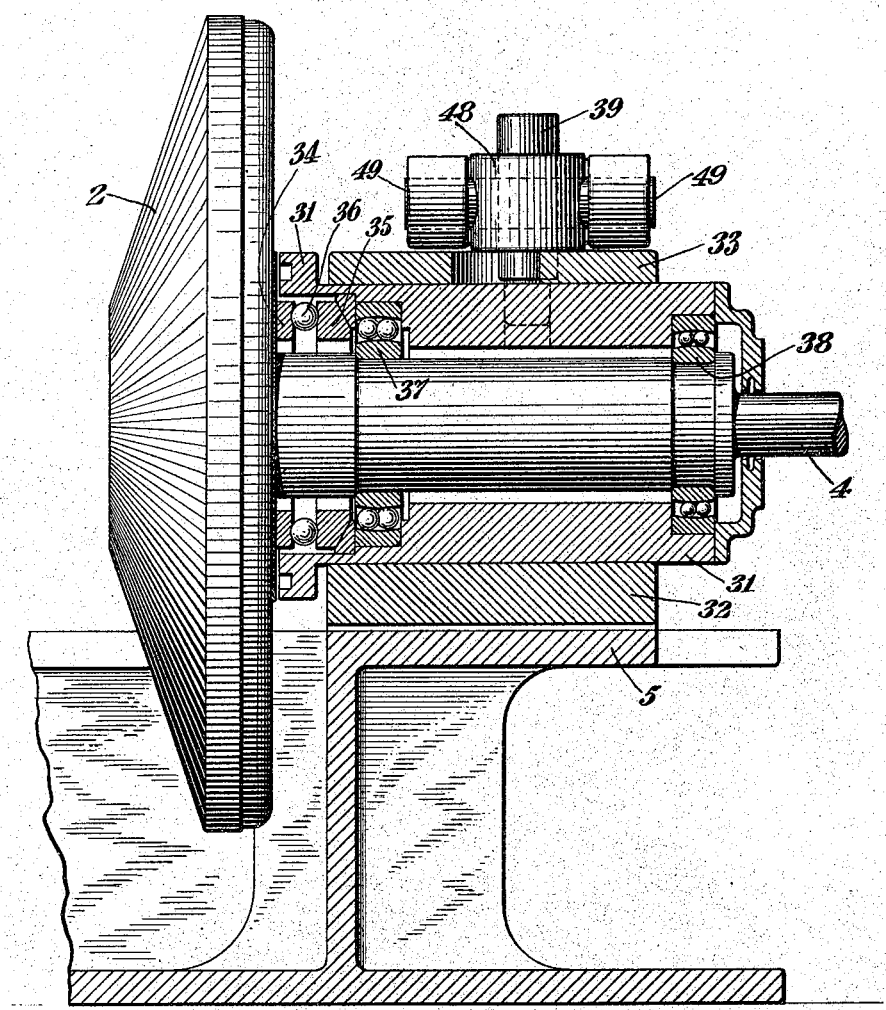

Figs. 3 and 4 are sectional views taken respectively on lines 3—3 and 4—4 of Fig. 1, looking in the direction of the arrows.

The invention is disclosed as applied to a pair of friction gears or cones 1 and 2 respectively, the shafts 3 and 4 which carry the cones running in suitable bearings, later to be described in greater detail, and preferably supported upon a suitable base or standard 5. In the present invention the gear 2 is provided with a permanent friction surface, for example, of steel, while the friction surface of cone 1 is made removable to enable the same to be renovated whenever necessary; for example, the friction surface of cone 1 may consist of a strip of friction material such as is used in brake linings, wound in spiral form around the cone, and with its ends suitably fastened in place, as described in my co-pending application Serial No. 573,902 filed July 10, 1922, and entitled Friction driving element.

According to this invention, at least one of the friction cones is so maintained in position as to prevent the driving pressure between the cones from reaching a value which would cause undue deterioration or destruction of the friction driving surfaces. In the illustrated embodiment, the cone 1 is supported in position against the driving surface of cone 2 by parts including a member which is designed to fail or give way when a predetermined pressure is imposed upon it by cone 1, whereby in case excessive pressure exists between cones 1 and 2 the failure of the above-mentioned member due to the resultant strains imposed upon it, will release cone 1 from its normal position sufficiently to permit the cone to move away from cone 2 and thus release the undue pressure on its friction surface.

Figure 2:
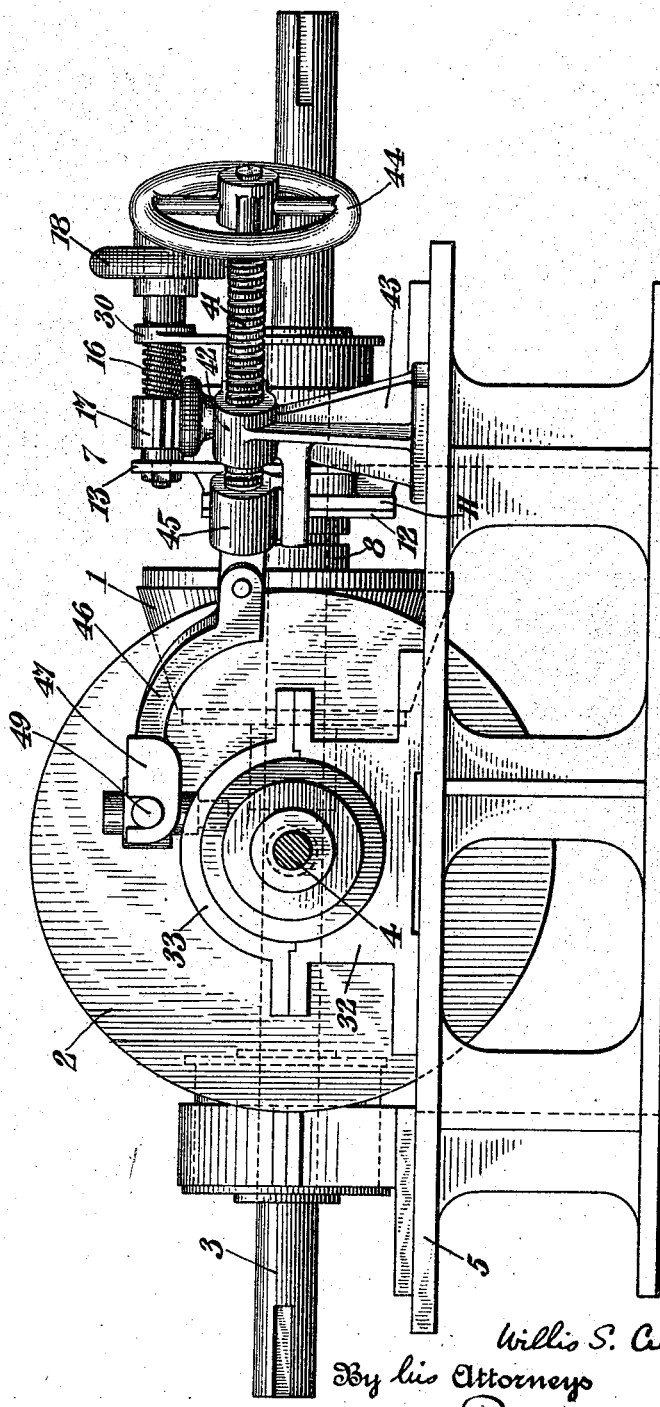
Fig. 2 is a side elevation of the structure shown in Fig. 1.

In the present embodiment, a bearing box having a base 6 and a cap 7, encloses the shaft 3 adjacent cone 1, and the latter is relieved from excessive strains by means of a thrust bearing interposed between the bearing box and the adjacent end of a hub 8 which supports the cone, the mechanism also preferably being arranged to permit cone 1 to be adjusted axially to vary the speed ratio of the gears. Referring more particularly to Fig. 3, the position of gear 1 may be adjusted axially by a sleeve member 9 having a cylindrical extension 10 fitting within the bearing box previously described, and an annular flange 11 which in the present instance opposes an annular thrust plate 12 interposed between said flange and the hub 8 of the friction gear. Suitable means is provided for moving the sleeve 9 back and forth with regard to the bearing box, thus shifting cone 1 accordingly; in the present embodiment, the sleeve 9 is provided with a lug 13 having a hole 14 adapted to receive a bolt 15, the latter passing through the lug and into the end of a screw threaded spindle 16 working within a split nut 17 mounted on the bearing box cap 7. A hand wheel 18 (Fig. 2) may be provided for spindle 16 to permit ready adjustment of the latter to position cone 1 to give the desired speed ratio.

A frangible or breakable thrust member is opposed to the cone 1, as above mentioned, such thrust member in the present embodiment comprising a thrust bearing having raceways 19 and 20 carrying rollers or balls 21, either the balls or the raceways, or both being constructed of a metal or alloy which will break at a pressure upon the bearing corresponding to the upper safety limit of pressure upon cone 1, or which will melt when the bearing reaches a predetermined abnormally high temperature such as would be induced by excessive pressure between the cones.

Thus the friction surface of gear 1 is protected against injury due to excessive pressure, by the automatic release of the cone when the pressure becomes great enough to break or melt the thrust member above described.

The thrust bearing members 19, 20 and 21 furthermore, are simple parts which may be readily replaced without extensive dismantling of the driving mechanism as a whole, and thus excessive pressure between the cones does not produce any injury to the mechanism which cannot be quickly repaired.

In the present instance, the shaft 3 is fixed to cone 1 to slide with the latter, and suitable sliding bearing members 26 and 27, which may be considered as of any suitable type, are disposed within the bearing box between the sleeve 9 as above described, and a further sleeve 28 having an inner cylindrical extension 29 similar to member 10 previously described, and a lug 30 which slidably surrounds spindle 16.

In the present embodiment of the invention, the cone 1 is adjusted primarily to vary the speed ratio between the gears, and the cone 2 is also adjustable axially, for the primary purpose of varying the pressure between the cones; thus where cones of the type illustrated are employed, the cone 1 ordinarily will be first adjusted to provide the desired speed ratio, and the cone 2 then moved axially a slight distance to obtain the desired pressure between the engaging surfaces of the cones.

As illustrated, the cone 2 is held in position by a thrust member 31 adapted to bear against the base of the cone, which is in the form of a sleeve surrounding shaft 4, and sliding in a bearing box consisting of base 32 and cap 33. Suitable thrust bearings, as indicated generally in Fig. 3 by numerals 34, 35 and 36, may be understood as interposed between the sleeve 31 and the base of the cone, as well as suitable further anti-friction bearings between the sleeve and the shaft 4, as indicated generally in Fig. 3 by numerals 37 and 38. The above parts, however, will not be described in detail since they may be considered as of any suitable type.

The position of the sleeve 31, and therefore of cone 2, is controlled by an adjusting device preferably of the force multiplying type. In the present embodiment, relatively inclined engaging surfaces are provided between the sleeve and an adjacent element, together with means for applying force to one of said engaging parts to wedge the thrust member 31 forwardly when desired. In the specific form of the invention which is illustrated, the sleeve 31 is provided with a pin 39 which projects through an inclined slot 40 in the bearing, whereby as the pin is rocked back and forth, its engagement with the inclined walls of such slot will move the sleeve 31 and therefore cone 2, in an axial direction.

As shown, the pin 39 is rocked back and forth by means of a screw threaded spindle 41 engaging with a split nut 42 mounted upon a standard 43, and operated by a hand wheel 44. The remaining end of the spindle is swiveled within a box 45, to which is pivotally connected a link 46 having a yoke 47 enclosing pin 39. Preferably the pin 39 is slidably and pivotally connected to yoke 47 by means of a collar 48 slidable on the pin, and provided with studs 49 which are pivotally received within the yoke 47. Thus the arcuate motion of pin 39 does not strain link 46 or the adjusting screw 41, during operation.

In the present embodiment, the shafts 3 and 4 are fixed to their respective cones 1 and 2, thus moving with the cones when the latter are adjusted; with such a construction it will be understood that the shafts may be slidingly connected (in any suitable manner not illustrated) to the shafting or similar transmission elements with which they are respectively associated, to permit the movement above referred to.

While a specific embodiment of the invention has been described, it is obvious that many changes may be made without departing from its spirit, as defined in the appended claims.

I claim:

1. In combination, a pair of engaging friction gears, means for moving one of said gears relative to the other to vary the pressure between their engaging surfaces, and means for preventing said pressure from exceeding a predetermined amount.

2. In combination, a pair of engaging friction gears, means for moving one of said gears relative to the other to vary the pressure between their engaging surfaces, and means for relieving the pressure between the engaging surfaces of said gears in case said pressure reaches a predetermined value.

3. In combination, a pair of engaging friction gears, a thrust member opposing one of said gears, an adjusting device for moving said thrust member axially of its respective gear to vary the pressure between the engaging surfaces of such gears, and a frangible member interposed between said thrust member and its respective gear to relieve the pressure between the engaging surfaces of said gears when the strain on said frangible member reaches a predetermined value.

4. The combination set forth in claim 3, wherein said frangible member is constituted by a thrust bearing.

5. The combination set forth in claim 3, wherein said thrust member is constituted by a sleeve slidably mounted rearwardly of its respective gear, and a screw mechanism for shifting the position of said sleeve.

6. The combination set forth in claim 3, wherein said thrust member is constituted by a sleeve slidably mounted in a bearing for the shaft of its respective gear, and a screw mechanism acting between the bearing and sleeve for adjusting the position of the latter.

7. In combination, a pair of engaging friction gears, a thrust member opposing one of said gears and tending to hold the same in frictional engagement with the other gear, and means associated with said thrust member whereby said frictional engagement is relieved when the pressure between the engaging surfaces of the gears exceeds a predetermined value.

8. In combination, a pair of engaging friction gears, a thrust member opposing one of said gears, and a frangible member interposed between said thrust member and its respective gear to relieve the pressure between the engaging surfaces of said gears when the strain on said frangible member reaches a predetermined value.

9. In combination a friction gear, a sleeve opposing a part movable therewith, said gear being rotatable relative to said sleeve, a bearing member enclosing said sleeve, said bearing member having therein a slot obliquely inclined to the axis of said gear, and said sleeve having a pin projecting through said slot, and means engaging said pin for moving the same angularly to shift the position of the sleeve in a direction axial to the gear, said means comprising a link pivoted to said pin, and an adjusting screw also pivoted and swiveled with regard to said link.

10. The combination set forth in claim 9, wherein said link includes a yoke, and a collar on said pin is pivoted to said yoke.

In testimony that I claim the foregoing, I have hereunto set my hand this 28th day of June, 1922.

WILLIS S. CRANDELL.